US011619286B2

(12) United States Patent
Konno et al.

(10) Patent No.: US 11,619,286 B2
(45) Date of Patent: Apr. 4, 2023

(54) TENSIONER UNIT, ROCKING LEVER, AND TENSIONER (71) Applicant: TSUBAKIMOTO CHAIN CO., Osaka (JP)

(72) Inventors: Masahiko Konno, Osaka (JP); Akira Kobara, Osaka (JP); Koichi Shimosaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 129 days.

(21) Appl. No.: 16/813,872

(22) Filed: Mar. 10, 2020

(65) Prior Publication Data
US 2020/0292034 A1 Sep. 17, 2020

(30) Foreign Application Priority Data

Mar. 13, 2019 (JP) ............................. JP2019-045465

(51) Int. Cl.
F16H 7/08 (2006.01)
F16H 7/18 (2006.01)

(52) U.S. Cl.
CPC ....... F16H 7/08 (2013.01); F16H 2007/0802 (2013.01); F16H 2007/0806 (2013.01);
(Continued)

(58) Field of Classification Search
CPC .............. F16H 7/08; F16H 2007/0802; F16H 2007/0806; F16H 2007/0812;
(Continued)

(56) References Cited

U.S. PATENT DOCUMENTS 5,088,966 A * 2/1992 Suzuki ...................... F16H 7/08
474/111
5,184,982 A * 2/1993 Shimaya ............... F16H 7/0848
474/101
(Continued)

FOREIGN PATENT DOCUMENTS

JP 2002-070963 A 3/2002
JP 2010-107021 A 5/2010
(Continued)

OTHER PUBLICATIONS

Office Action dated Jan. 10, 2023, issued in counterpart JP Application No. 2019-045465, with English Translation. (11 pages).

Primary Examiner — Michael R Mansen
Assistant Examiner — Raveen J Dias
(74) Attorney, Agent, or Firm — WHDA, LLP (57) ABSTRACT To provide a tensioner unit, a rocking lever, and a tensioner, which, prevent breakage of the tensioner in use for a prolonged period of time. A protruding part is provided to a rocking lever near an abutment surface for abutment with a plunger to make contact with a tensioner body. h and H satisfy the relationship of h<H, where h denotes a protruding amount of a lead part of the plunger, where the lead part means a part protruding from the plunger bore, from a tip end surface on an opened side of the tensioner body in a state where the plunger sits on a bottom of the plunger bore, and H denotes an interval between the abutment surface of the rocking lever and the tip end surface of the tensioner body when the protruding part is brought into contact with the tensioner body.

7 Claims, 10 Drawing Sheets (52) U.S. Cl.
CPC ............... *F16H 2007/0814* (2013.01); *F16H 2007/0872* (2013.01); *F16H 2007/0882* (2013.01); *F16H 2007/0893* (2013.01); *F16H 2007/0895* (2013.01); *F16H 2007/0897* (2013.01); *F16H 2007/185* (2013.01)

(58) Field of Classification Search
CPC ..... F16H 2007/0859; F16H 2007/0863; F16H 2007/0872; F16H 7/18; F16H 2007/185; F16H 2007/0891; F16H 2007/0893; F16H 2007/0895; F16H 2007/0897; F16H 2007/0808; F16H 2007/0834; F16H 2007/0838
USPC .......................................... 474/110, 111, 140
See application file for complete search history.

(56) References Cited

U.S. PATENT DOCUMENTS

| | | | | |
|---|---|---|---|---|
| 5,184,983 | A * | 2/1993 | Shimaya | F16H 7/08 474/111 |
| 5,222,917 | A * | 6/1993 | Shimaya | F16H 7/08 474/101 |
| 5,314,388 | A * | 5/1994 | Suzuki | F16H 7/08 474/110 |
| 5,318,482 | A * | 6/1994 | Sato | F16H 7/08 474/111 |
| 5,352,159 | A * | 10/1994 | Suzuki | F16H 7/08 474/110 |
| 5,908,363 | A * | 6/1999 | Suzuki | F16H 7/0848 474/101 |
| 5,967,921 | A * | 10/1999 | Simpson | F16H 7/08 474/110 |
| 6,045,471 | A * | 4/2000 | Suzuki | F16H 7/08 474/109 |
| 6,086,498 | A * | 7/2000 | Hashimoto | F16H 7/08 474/111 |
| 6,875,141 | B2 * | 4/2005 | Konishi | F16H 7/0836 474/101 |
| 2002/0002090 | A1 * | 1/2002 | Koch | F16H 7/08 474/101 |
| 2002/0019282 | A1 * | 2/2002 | Namie | F16H 7/0848 474/109 |
| 2003/0139238 | A1 * | 7/2003 | Konno | F16H 7/18 474/111 |
| 2004/0159296 | A1 * | 8/2004 | Fink | F16H 7/08 123/90.31 |
| 2007/0029696 | A1 * | 2/2007 | Kurematsu | F16H 7/18 264/172.19 |
| 2007/0082775 | A1 * | 4/2007 | Perissinotto | F16H 7/18 474/140 |
| 2008/0119309 | A1 * | 5/2008 | Kern | F16H 7/0836 474/109 |
| 2010/0016105 | A1 * | 1/2010 | Yoshimura | F16H 7/0848 474/110 |
| 2010/0173735 | A1 * | 7/2010 | Suchecki | F02B 67/06 474/110 |
| 2013/0090201 | A1 * | 4/2013 | Mori | F16H 7/18 474/140 |
| 2013/0190117 | A1 * | 7/2013 | Bauer | F16H 7/0848 474/111 |
| 2013/0331212 | A1 * | 12/2013 | Kurematsu | F16H 7/0836 474/110 |
| 2015/0005120 | A1 * | 1/2015 | Kurematsu | F16H 7/08 474/111 |
| 2016/0069432 | A1 * | 3/2016 | Wach | F16H 7/08 474/111 |
| 2016/0123436 | A1 | 5/2016 | Takagi et al. | |
| 2016/0252167 | A1 * | 9/2016 | Guyot | F16H 7/08 474/111 |

FOREIGN PATENT DOCUMENTS

| | | |
|---|---|---|
| JP | 2011-112177 A | 6/2011 |
| JP | 2016-089953 A | 5/2016 |

* cited by examiner

Related Art

Fig. 14

Related Art

TENSIONER UNIT, ROCKING LEVER, AND TENSIONER

BACKGROUND OF THE INVENTION

1. Field of the Invention

The present invention relates to a tensioner including a tensioner body having a cylindrical plunger bore with an open end, a cylindrical plunger slidably inserted in the plunger bore, and biasing means that biases the plunger outward, to a rocking lever including a guide surface that makes sliding contact with an endless running transmission member, a rockably supported boss part, and an abutment surface provided on the opposite side from the guide surface, and to a tensioner unit that includes these tensioner and rocking lever.

2. Description of the Related Art

It has been common practice to use a tensioner unit made up of a tensioner and a rocking lever for maintaining appropriate tension of an endless transmission member such as a running chain or the like. For example, a chain guide mechanism of a timing system has been known, which slidably guides, by means of a guide shoe, a drive chain such as an endless roller chain passing over respective sprockets of a crankshaft and a cam shaft inside an engine room, and which uses a tensioner to bias a rocking lever having the guide shoe to maintain appropriate tension (see, for example, Japanese Patent Application Laid-open No. 2016-89953).

Figure 13:
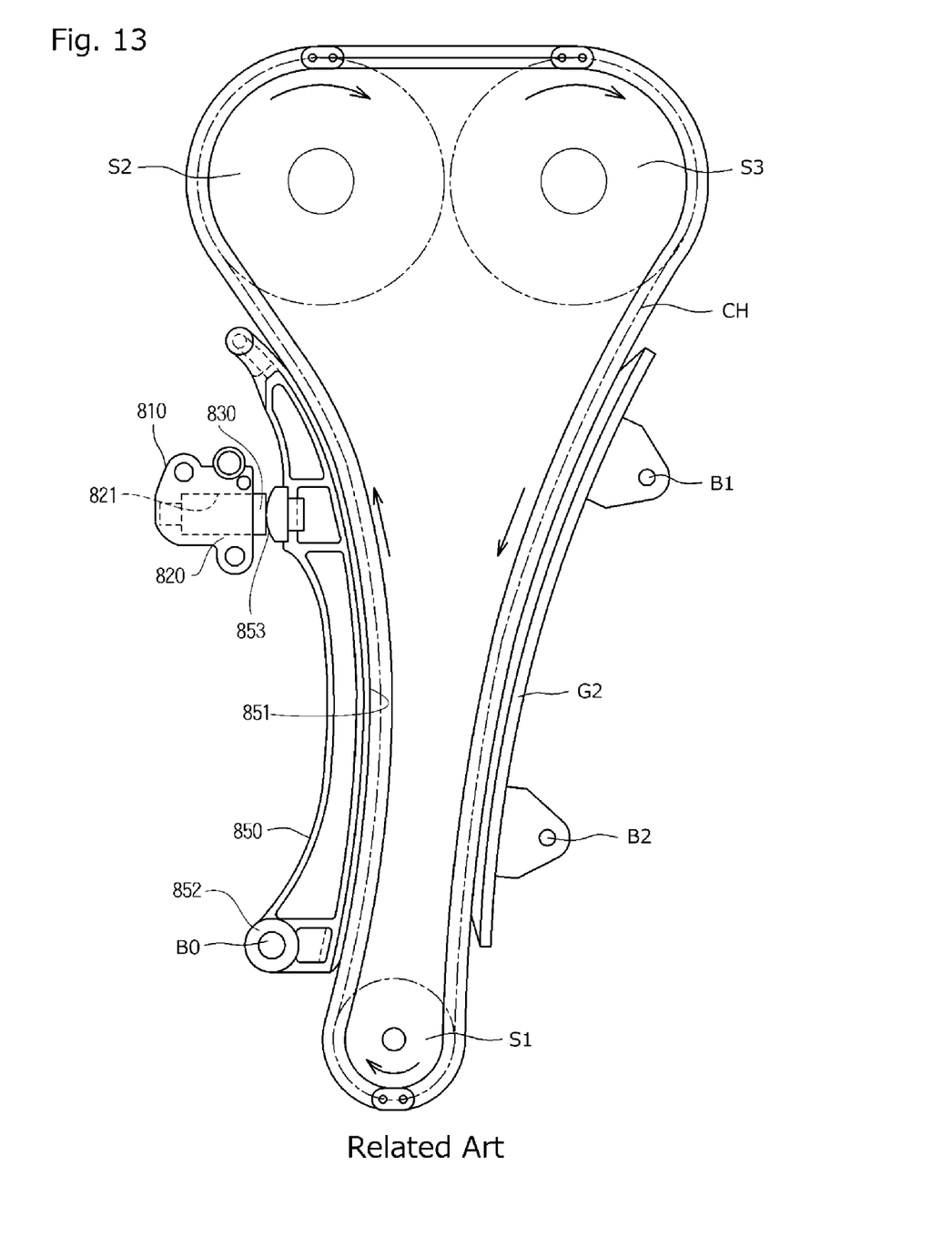
FIG. 13 is an illustrative diagram of a conventional timing system of an engine.

In the timing system of the engine, for example, as shown in FIG. 13, a timing chain CH endlessly passes over a drive sprocket S1 mounted to a crankshaft and a pair of driven sprockets S2 and S3 mounted to cam shafts inside the engine room, and this timing chain CH is guided by a rocking lever 850 and a fixed chain guide G2.

The fixed chain guide G2 is fixed in position in the engine room with two mounting shafts B1 and B2, while the rocking lever 850 is attached such as to be rockable in the plane in which the timing chain CH runs inside the engine room.

The chain tensioner 810 presses the rocking lever 850 and thereby maintains the tension of the timing chain CH at an appropriate level as well as reduces its vibration.

Figure 14:
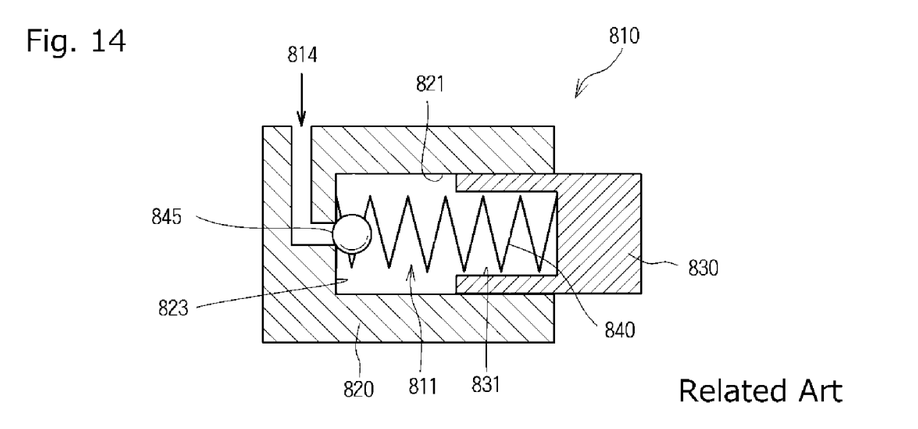
FIG. 14 is a schematic illustrative diagram of a conventional tensioner.

One known chain tensioner 810 used to press the rocking lever 850 includes, for example, as shown schematically in FIG. 14, a tensioner body 820 having a cylindrical plunger bore 821 with an open end, a cylindrical plunger 830 slidably inserted in the plunger bore 821, and biasing means that biases the plunger 830 outward of the plunger bore 821.

The biasing means is formed by a coil spring 840 accommodated inside a cylindrical recess 831 in the cylindrical plunger 830 and compressed between the plunger and a bottom part 823 of the plunger bore 821.

The known rocking lever 850 pressed by the tensioner 810 includes, as shown in FIG. 13, a guide surface 851 that makes sliding contact with the running timing chain CH, a boss part 852 rockably supported on a mounting shaft B0, and an abutment surface 853 provided on the opposite side from the guide surface 851.

Oil is supplied from an oil supply hole 814 formed in the plunger bore 821 of the tensioner 810, so that an oil pressure chamber 811 formed between the plunger bore 821 and the plunger 830 is filled with oil and the plunger 830 is biased outward by the oil. A check valve 845 (schematically shown as a check ball alone) stops the oil from flowing out from the oil supply hole 814.

As the plunger 830 reciprocates, the oil flows through the small gap between the plunger 830 and the plunger bore 821, and the flow resistance provides the damping effect of slowing down the reciprocal movement of the plunger 830.

SUMMARY OF THE INVENTION

One problem with this known tensioner 810 was that, when left to stand for a long time after the stop of oil supply (in the case with an engine, after the engine has been stopped), there was a time lag in the supply of oil immediately after the next start-up, so that, as the plunger 830 moves back and forth, the oil in the oil pressure chamber 811 only flows out and is not replenished. The damping force by the oil does not act on the plunger 830 sufficiently due to the lack or absence of oil inside the oil pressure chamber 811. As a result, when the timing chain CH vibrates largely and hits the rocking lever 850, the force from the rocking lever 850 cannot be received by the coil spring 840 alone, so that the plunger 830 is thrust back largely toward the bottom part 823 and collides against the bottom part 823 of the plunger bore 821 with a great force. Such a collision repeated over the period of use may lead to breakage of check valve components that are disposed in the bottom part 823 of the tensioner body 820 or in a rear part of the plunger 830, or lead to sticking of the plunger 830 which may result in failures of the tensioner 810.

Another problem was that the collision between the plunger 830 and the bottom part 823 of the plunger bore 821, which are metal parts, generated large vibration and noise immediately after the start-up.

An object of the present invention is to solve these problems and to provide a tensioner unit, a rocking lever, and a tensioner, which, with a simple structure, minimize operation failures, prevent breakage of the tensioner in use for a prolonged period of time to achieve a long service life, and can suppress large vibration and noise immediately after start-up.

A tensioner unit according to the present invention includes: a tensioner including a tensioner body having a cylindrical plunger bore with an open end, a cylindrical plunger slidably inserted in the plunger bore, and biasing means that biases the plunger outward of the cylindrical plunger bore;

a rocking lever including a guide surface that makes sliding contact with an endless running transmission member, a rockably supported boss part, and an abutment surface provided on an opposite side from the guide surface for abutment with the plunger; wherein the tensioner unit has a protruding part that is provided to the rocking lever near the abutment surface for abutment with the plunger and that makes contact with a tip end surface of the tensioner body, and/or a protruding part that is provided to a tip portion of the plunger in a protruding side protruding outward of the cylindrical plunger bore and that makes contact with the rocking lever, wherein h and H satisfy the relationship of h<H, where h denotes a protruding amount of a lead part of the plunger, where the lead part means a part protruding from the plunger bore, from a tip end surface on an opened side of the tensioner body in a state where the plunger sits on a bottom of the plunger bore of the tensioner body, and H denotes an interval (a protruding height) between the abutment surface of the rocking lever and the tip end surface of the tensioner body when the protruding part is brought into contact with the tip end surface of the tensioner body, and/or when the protruding part is brought into contact with the rocking lever, whereby the problems described above are solved.

The present invention solves the above problems by providing a rocking lever used for the tensioner unit described above, the rocking lever including a guide surface that makes sliding contact with an endless running transmission member, a rockably supported boss part, and an abutment surface provided on an opposite side from the guide surface for abutment with the plunger, and the rocking lever having a protruding part that is provided near the abutment surface for abutment with the plunger and that makes contact with the tip end surface of the tensioner body, wherein h and H satisfy the relationship of h<H, where h denotes a protruding amount of a lead part of the plunger, where the lead part means a part protruding from the plunger bore, from a tip end surface on an opened side of the tensioner body in a state where the plunger sits on a bottom of the plunger bore of the tensioner body, and H denotes an interval (a protruding height) between the abutment surface of the rocking lever and the tip end surface of the tensioner body when the protruding part is brought into contact with the tip end surface of the tensioner body.

The present invention solves the above problems by providing a tensioner used for the tensioner unit described above, the tensioner including a tensioner body having a cylindrical plunger bore with an open end, a cylindrical plunger slidably inserted in the plunger bore, biasing means that biases the plunger outward of the cylindrical plunger bore, and the tensioner having a protruding part that is provided to a tip portion in a protruding direction of the plunger of the tensioner body and that makes contact with the rocking lever, wherein h and H satisfy the relationship of h<H, where h denotes a protruding amount of a lead part of the plunger, where the lead part means a part protruding from the plunger bore, from a tip end surface on an opened side of the tensioner body in a state where the plunger sits on a bottom of the plunger bore of the tensioner body, and H denotes an interval (a protruding height) between the abutment surface of the rocking lever and the tip end surface of the tensioner body when the protruding part is brought into contact with the rocking lever.

According to the tensioner unit set forth in claim 1, a protruding part is provided to the rocking lever near the abutment surface for abutment with the plunger and that makes contact with a tip end surface of the tensioner body, and the protruding height H of the protruding part of the rocking lever is greater than the protruding amount h of the lead part of the plunger from the tip end surface of the tensioner body in a state where the plunger sits on the bottom of the plunger bore. When vibration is transmitted from the timing chain to the tensioner via the rocking lever, the contact that occurs between the tensioner body and the protruding part of the rocking lever prevents contact between the lead part of the plunger and the rocking lever in the state where the plunger sits on the bottom of the plunger bore, so that collision of the plunger against the bottom of the plunger bore is prevented even when no damping force acts on the plunger by the oil. As a result, possibilities of operation failures of the tensioner are reduced, which minimizes breakage of the tensioner in use over a prolonged period of time and ensures a long service life. Since the protruding part can be made only by forming a portion of the main body of the rocking lever integral therewith such as to protrude, the effects described above can be readily achieved without causing an increase in production cost. If the protruding part is made of resin, noise and vibration caused by contact with the metal tensioner body can be reduced.

Similar effects can be achieved by providing the protruding part to the tensioner body, which means the degree of freedom in design is high. Namely, a protruding part may be provided to a tip portion in a protruding direction of the plunger of the tensioner body to make contact with the rocking lever, such that the protruding height H of the protruding part of the tensioner is greater than the protruding amount h of the plunger. This way, too, when vibration is transmitted from the timing chain to the tensioner via the rocking lever, the contact that occurs between the protruding part of the tensioner body and the rocking lever prevents contact between the lead part of the plunger and the rocking lever in the state where the plunger sits on the bottom of the plunger bore, so that collision of the plunger against the bottom of the plunger bore is prevented even when no damping force acts on the plunger by the oil. As a result, possibilities of operation failures of the tensioner are reduced, which minimizes breakage of the tensioner in use over a prolonged period of time and ensures a long service life. Since the protruding part can be made only by forming a portion of the main body of the tensioner body integral therewith such as to protrude, the effects described above can be readily achieved without causing an increase in production cost. If the protruding part is made of resin, noise and vibration caused by contact with the metal rocking lever can be reduced.

According to the configuration set forth in claim 2, the protruding part is configured by at least one of the lips provided to protrude more than the abutment surface on both sides in a width direction of the abutment surface, so that effects similar to those described above can be achieved even when there is no space available on the rocking lever opposite the tensioner body in the front and in the back of the chain running direction, and also, the rocking lever can be restricted from being displaced relative to the plunger.

According to the configuration set forth in claim 3, the rocking lever is made up of a base member, and a pad fitted to a part of the base member including the abutment surface for abutment with the plunger, the protruding part being formed to either one of the pad and the base member, which provides effects similar to those described above and ensures a high degree of freedom in design. If the pad or the base member to which the protruding part is provided is made of resin, production is made easy and the production cost can be reduced. If the pad or the base member to which the protruding part is provided is made of resin, noise and vibration caused by contact between the protruding part and the tensioner body can be reduced even though the tensioner body is made of metal.

According to the configuration set forth in claim 4, the protruding part has at least one groove in the tip end surface thereof, which helps alleviate the collision noise, as this groove allows compressed air escape when the tensioner body and the rocking lever contact (collide) with each other.

According to the configuration set forth in claim 5, the protruding part has a through hole or a blind hole that opens in a side face thereof. The engine oil entering this through hole or blind hole can help lower the temperature that inevitably rises as the tensioner body and the rocking lever repeatedly comes into contact (collide) with each other. As a result, deterioration or breakage of components can be prevented. The holes also help prevent formation of sink marks or voids during the molding of the protruding part, when the rocking lever and/or the tensioner body to which the protruding part is provided is/are made of resin, and thus the strength of the rocking lever and/or tensioner body can be maintained.

According to the configuration set forth in claim 6, the rocking lever and the tensioner may be united together, which can also provide effects similar to those described above.

According to the rocking lever set forth in claim 7, a protruding part is provided to the rocking lever near the abutment surface for abutment with the plunger to make contact with a tip end surface of the tensioner body, and the protruding height H of the rocking lever is greater than the protruding amount h of the lead part of the plunger from the tip end surface of the tensioner body in a state where the plunger sits on the bottom of the plunger bore of the tensioner body. When vibration is transmitted from the timing chain to the tensioner via the rocking lever, the contact that occurs between the tensioner body and the protruding part of the rocking lever prevents contact between the lead part of the plunger and the rocking lever in the state where the plunger sits on the bottom of the plunger bore, so that collision of the plunger against the bottom of the plunger bore is prevented even when no damping force acts on the plunger by the oil. As a result, possibilities of operation failures of the tensioner are reduced, which minimizes breakage of the tensioner in use over a prolonged period of time and ensures a long service life. Since the protruding part can be made only by forming a portion of the main body of the rocking lever integral therewith such as to protrude, the effects described above can be readily achieved without causing an increase in production cost. If the protruding part is made of resin, noise and vibration caused by contact with the metal tensioner body can be reduced.

According to the tensioner set forth in claim 8, a protruding part may be provided to a tip portion in a protruding direction of the plunger of the tensioner body to make contact with the rocking lever, such that the protruding height H of the protruding part of the tensioner is greater than the protruding amount h of the plunger. This way, too, when vibration is transmitted from the timing chain to the tensioner via the rocking lever, the contact that occurs between the protruding part of the tensioner body and the rocking lever prevents contact between the lead part of the plunger and the rocking lever in the state where the plunger sits on the bottom of the plunger bore, so that collision of the plunger against the bottom of the plunger bore is prevented even when no damping force acts on the plunger by the oil. As a result, possibilities of operation failures of the tensioner are reduced, which minimizes breakage of the tensioner in use over a prolonged period of time and ensures a long service life. Since the protruding part can be made only by forming a portion of the main body of the tensioner body integral therewith such as to protrude, the effects described above can be readily achieved without causing an increase in production cost. If the protruding part is made of resin, noise and vibration caused by contact with the metal rocking lever can be reduced.

DESCRIPTION OF THE PREFERRED EMBODIMENTS

A tensioner unit according to the present invention can have any specific configuration as long as it includes a tensioner including a tensioner body having a cylindrical plunger bore with an open end, a cylindrical plunger slidably inserted in the plunger bore, and biasing means that biases the plunger outward; a rocking lever including a guide surface that makes sliding contact with an endless running transmission member, a rockably supported boss part, and an abutment surface provided on an opposite side from the guide surface for abutment with the plunger; and a protruding part that is provided to the rocking lever near the abutment surface for abutment with the plunger and that makes contact with a tip end surface of the tensioner body, and/or a protruding part that is provided to a tip portion in a protruding direction of the plunger of the tensioner body and that makes contact with the rocking lever, the plunger having a lead part that protrudes from the tip end surface of the tensioner body by an amount h in a state where the plunger sits on a bottom of the plunger bore of the tensioner body, h satisfying h<H, where H is an interval (protruding height) between the abutment surface of the rocking lever and the tip end surface of the tensioner body when the protruding part is brought into contact with the tip end surface of the tensioner body, and/or when the protruding part is brought into contact with the rocking lever, and as long as the tensioner unit can, with a simple structure, prevent collision of the plunger against the bottom part of the tensioner body to minimize operation failures of the tensioner and to prevent breakage of the tensioner in use for a prolonged period of time, as well as allow for easy production and reduction in the production cost.

For example, the tensioner may have any known internal structure, and the rocking lever may be made of any material.

Embodiment 1

A tensioner unit 100 according to a first embodiment of the present invention will be described with reference to the drawings.

Figure 1:
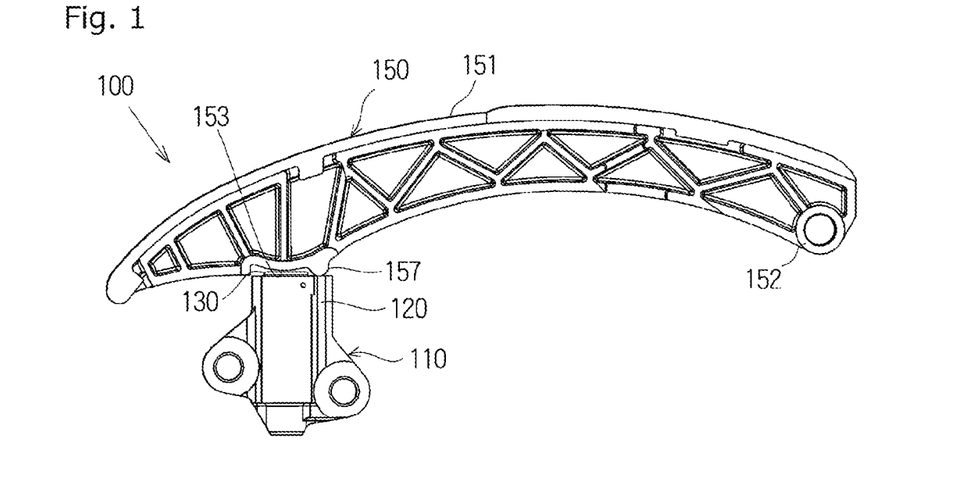
FIG. 1 is a front view of a tensioner unit according to a first embodiment of the present invention.

The tensioner unit 100 is made up of a tensioner 110 and a rocking lever 150.

Figure 2:
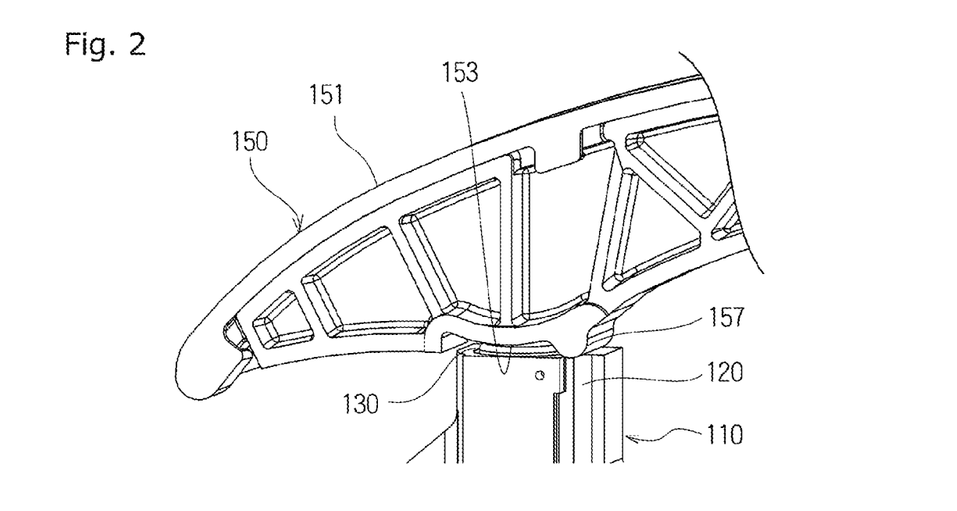
FIG. 2 is a partial enlarged perspective view of the tensioner unit of FIG. 1.
Figure 3:
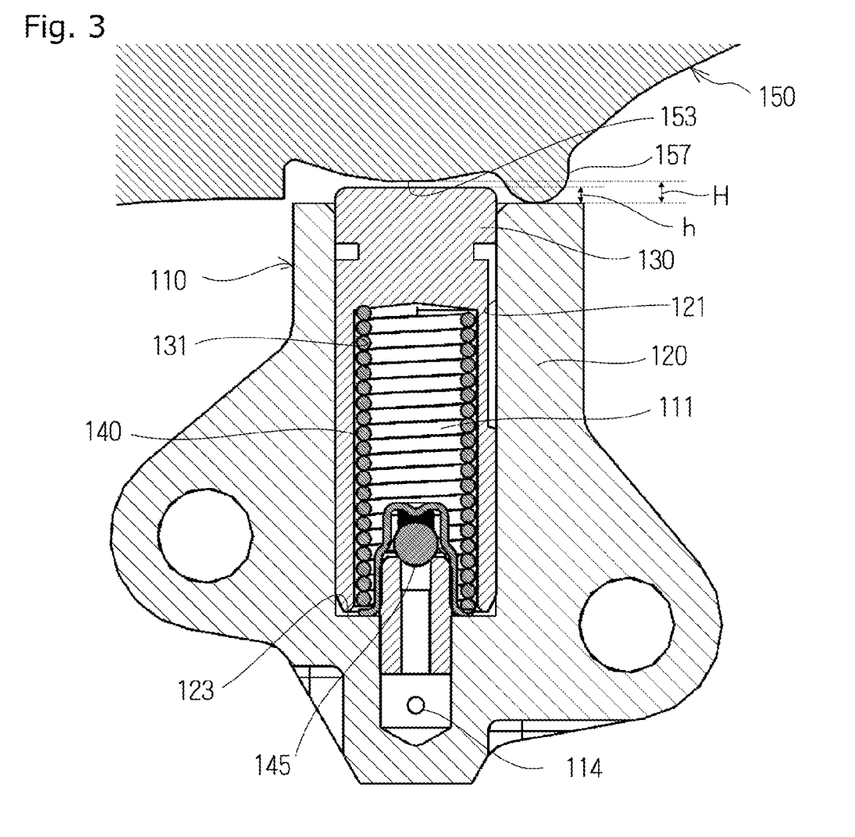
FIG. 3 is a partial enlarged cross-sectional view of the tensioner unit of FIG. 1.

The tensioner 110 includes, as shown in FIG. 1 to FIG. 3, a tensioner body 120 having a cylindrical plunger bore 121 with an open end, a cylindrical plunger 130 slidably inserted in the plunger bore 121, and biasing means accommodated inside an oil pressure chamber 111 formed between the plunger bore 121 and the rear end of the plunger 130 such as to be able to freely expand and contract and to bias the plunger 130 outward.

The biasing means is formed by a coil spring 140 accommodated inside a cylindrical recess 131 in the cylindrical plunger 130 and compressed between the plunger and a bottom part 123 of the plunger bore 121.

In this embodiment, oil is supplied from an oil supply hole 114 formed in the plunger bore 121 of the tensioner 110, so that the oil pressure chamber 111 is filled with the oil and the plunger 130 is biased outward by the oil. A check valve 145 stops the oil from flowing out from the oil supply hole.

The rocking lever 150 includes a guide surface 151 that makes sliding contact with a running chain (not shown), a rockably supported boss part 152, and an abutment surface 153 that is provided on the opposite side from the guide surface 151 for abutment with the plunger 130.

Adjacent the abutment surface 153 on the side closer to the boss part 152 is provided a protruding part 157, which is brought into contact with a tip end surface of the tensioner body 120 of the tensioner 110 when the rocking lever 150 rocks to a position closest to the tensioner 110.

In this embodiment, the protruding part 157 has a semicircular cross-sectional shape in the plane in which the chain runs, i.e., it is semi-columnar as a whole and extends along the entire width of the rocking lever 150. Since the protruding part 157 has a curved surface near its apex (point at which it is brought into contact with the tensioner 110), the contact between the protruding part 157 of the rocking lever 150 and the tip end surface of the tensioner body 120 is always stable even when the engine block or the rocking lever 150 expand or contract due to linear expansion caused by temperature changes inside the engine.

Since the protruding part 157 is formed to extend over the entire width of the rocking lever 150 in this embodiment, it is brought into contact with the tensioner body 120 with a sufficient width so that the surface pressure is lowered and durability is improved.

The protruding part 157 may be provided anywhere near the abutment surface 153 where the protruding part is able to contact the tensioner body 120.

As shown in FIG. 3, the distance (protruding height) H between the abutment surface 153 of the rocking lever 150 and the tip end surface of the tensioner body 120 when the protruding part 157 is brought into contact with the tip end surface of the tensioner body 120 is greater than the protruding amount h of the lead part of the plunger 130 from the tip end surface of the tensioner body 120 in a state where the plunger 130 sits on the bottom of the plunger bore 121 of the tensioner body 120, i.e., h<H.

There follows a description of how the tensioner unit 100 according to the first embodiment of the present invention configured as described above operates immediately after started up following a long period of being left to stand after the stop of oil supply (in the case with an engine, after the engine has been stopped).

Immediately after the start-up, there is a time lag in oil supply so that oil is not supplied for a while. In this state, when the rocking lever 150 rocks in the direction opposite from the protruding direction of the plunger 130, the abutment surface 153 of the rocking lever 150 is brought into contact with and presses the tip end surface of the lead part of the plunger 130 so that the plunger 130 is pushed in oppositely from the protruding direction. When the rocking lever 150 rocks further in the direction opposite from the protruding direction of the plunger 130, the protruding part 157 of the rocking lever 150 is brought into contact with the tip end surface of the tensioner body 120 of the tensioner 110. At this time, even though the abutment surface 153 of the rocking lever 150 and the tip end surface of the plunger 130 are in contact with each other, the plunger 130 does not touch the bottom part 123 of the plunger bore 121. Since the protruding height H of the protruding part 157 is greater than the protruding amount h of the lead part of the plunger 130, the abutment surface 153 of the rocking lever 150 does not contact the tip end surface of the plunger 130 when the plunger 130 has reached the bottom part 123 of the plunger bore 121. Therefore, according to the present invention, the rocking lever 150 does not cause the plunger 130 to reach the bottom directly.

Embodiment 2

In a tensioner unit according to a second embodiment of the present invention, in comparison to the previously described tensioner unit 100 according to the first embodiment, the protruding part has a groove, or a through hole, or a blind hole in the tip end surface.

Figure 4:
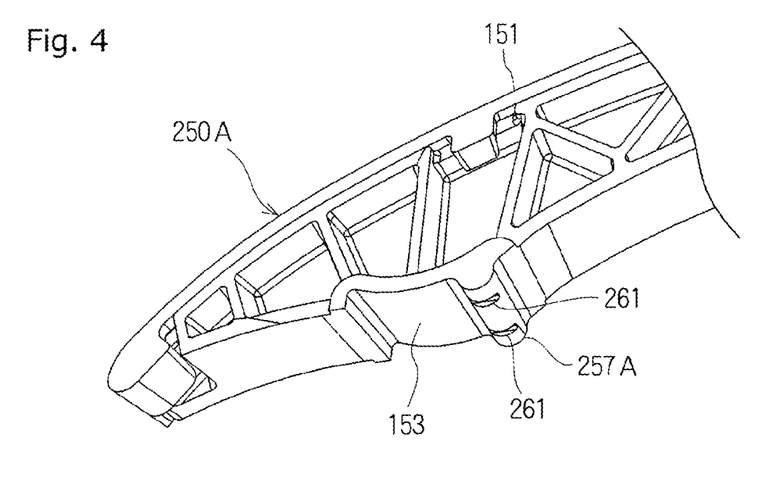
FIG. 4 is a perspective view of a rocking lever of a tensioner unit according to a second embodiment of the present invention.

For example, the rocking lever 250A has a protruding part 257A that is semi-columnar as a whole and extends along the entire width of the rocking lever 250A as shown in FIG. 4. Two channel-like grooves 261, 261 extending along the chain running direction are formed in the circumferential surface of the protruding part 257A opposite the tip end surface of the tensioner body 120 (Parts that have similar configurations as those of the tensioner unit 100 of the first embodiment will be represented by the same reference numerals. The same applies to other drawings referred to in the following).

Figure 5:
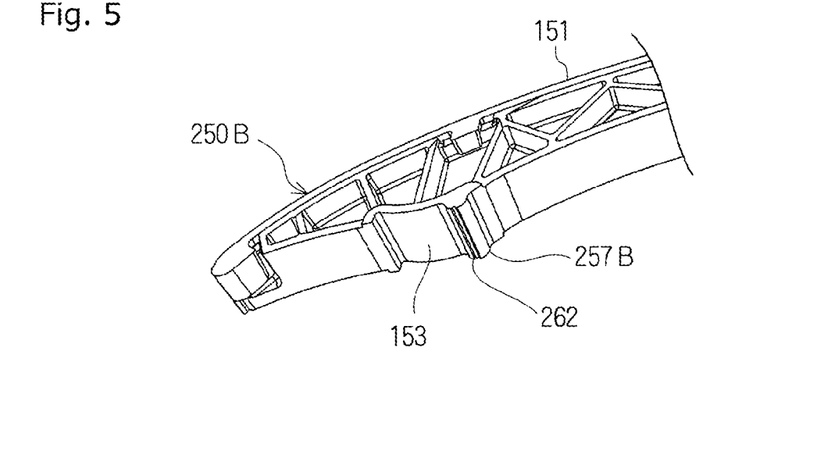
FIG. 5 is a perspective view of the rocking lever of a tensioner unit according to a variation example of the second embodiment of the present invention.

Alternatively, for example, the rocking lever 250B has a protruding part 257B that is semi-columnar as a whole and extends along the entire width of the rocking lever 250B as shown in FIG. 5, and is formed with one channel-like groove 262 extending along the width direction of the rocking lever 250B in the circumferential surface of the protruding part 257B opposite the tip end surface of the tensioner body 120.

Figure 6:
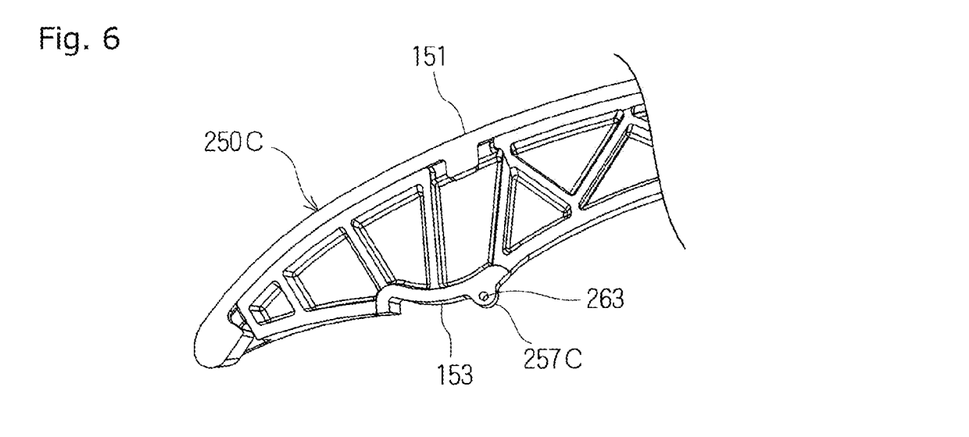
FIG. 6 is a perspective view of the rocking lever of the tensioner unit according to a variation example of the second embodiment of the present invention.

Alternatively, for example, the rocking lever 250C has a protruding part 257C that is semi-columnar as a whole and extends along the entire width of the rocking lever 250C as shown in FIG. 6, and is formed with a through hole 263 extending axially parallel therein to open in both side faces in the width direction of the protruding part 257C.

Figure 7A:
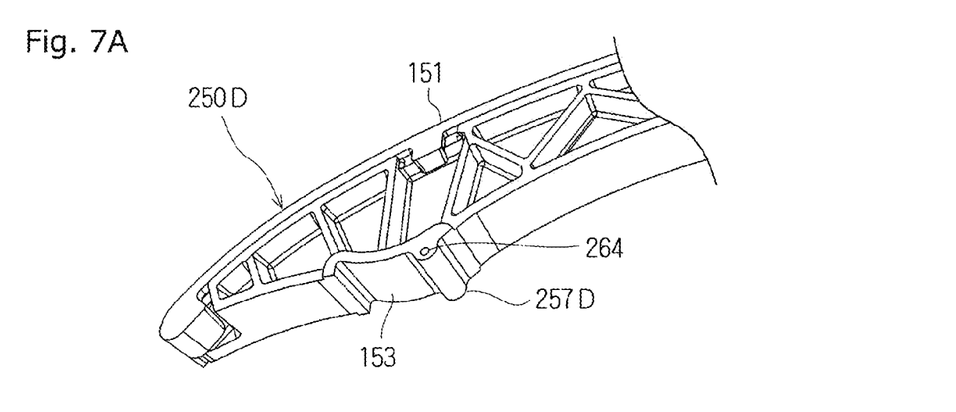
FIG. 7A is a perspective view of the rocking lever of the tensioner unit according to a variation example of the second embodiment of the present invention.
Figure 7B:
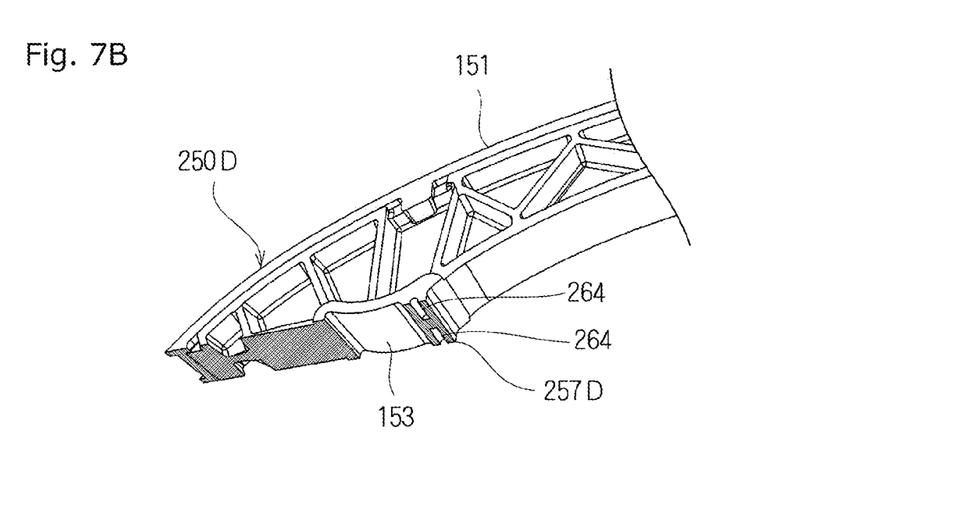
FIG. 7B is a partial cross-sectional view of the rocking lever of FIG. 7A.

Alternatively, for example, the rocking lever 250D has a protruding part 257D that is semi-columnar as a whole and extends along the entire width of the rocking lever 250D as shown in FIG. 7A and FIG. 7B, and is formed with two blind holes 264, 264 open in both side faces in the width direction of the protruding part 257D.

Embodiment 3

In a tensioner unit 300 according to a third embodiment of the present invention, in comparison to the previously described tensioner unit 100 according to the first embodiment, the protruding part is formed in a different position.

Figure 8:
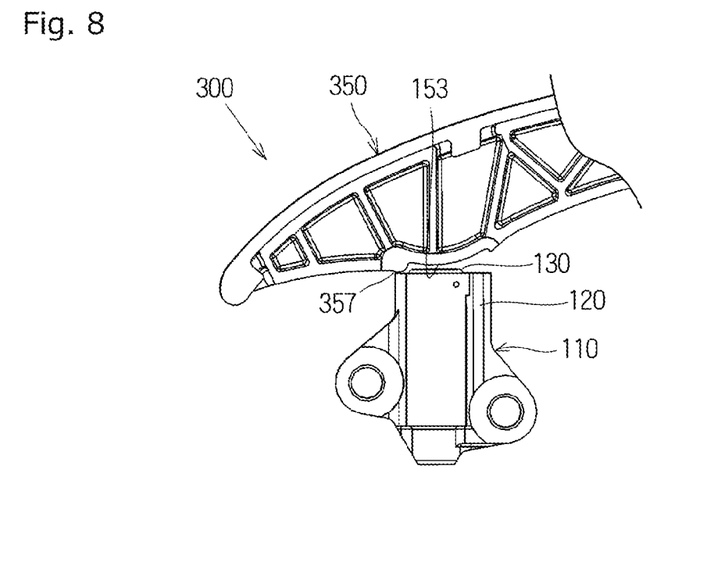
FIG. 8 is a front view of a tensioner unit according to a third embodiment of the present invention.

The protruding part 357 of the rocking lever 350 according to this embodiment is provided adjacent the abutment surface 153 of the rocking lever 350 on the side opposite from the boss part 152, as shown in FIG. 8, so that the protruding part is brought into contact with the tip end surface of the tensioner body 120 of the tensioner 110 when the rocking lever 350 rocks to a position closest to the tensioner 110.

The tensioner unit 300 according to the third embodiment allows for suitable selection of the position of the protruding part 357 and offers a higher degree of design freedom even when sufficient space is not available to form the protruding part in such a position as that of the protruding part 157 of the tensioner unit 100 according to the first embodiment.

Embodiment 4

In a tensioner unit 400 according to a fourth embodiment of the present invention, in comparison to the previously described tensioner unit 100 according to the first embodiment, the protruding part is formed by at least one of lips.

Figure 9A:
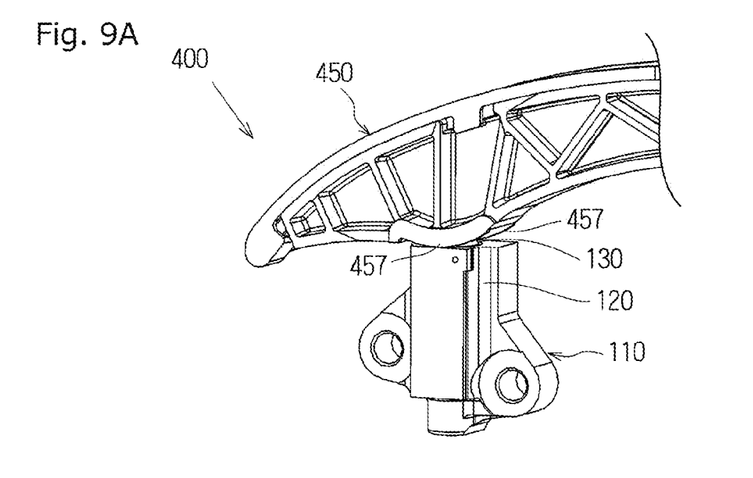
FIG. 9A is a perspective view of the rocking lever of the tensioner unit according to a variation example of a fourth embodiment of the present invention.
Figure 9B:
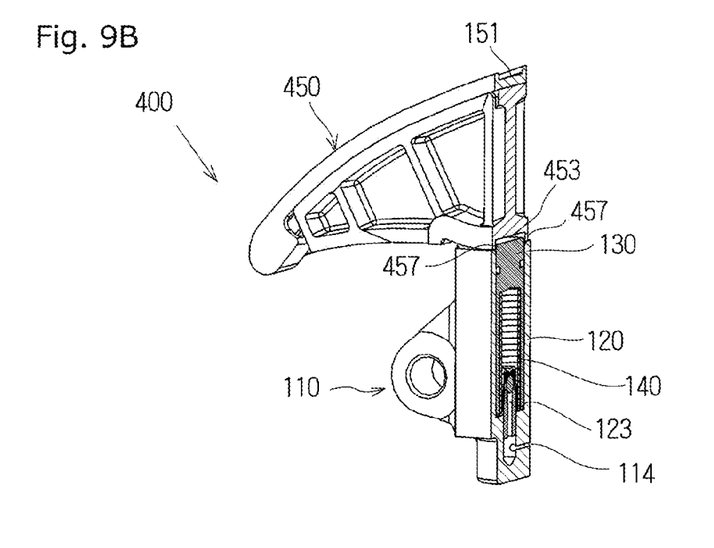
FIG. 9B is a partial cross-sectional view of the tensioner unit of FIG. 9A.

The rocking lever 450 according to this embodiment is provided with lips that protrude more than the abutment surface 453 on both sides in the width direction of the abutment surface 453 as shown in FIG. 9A and FIG. 9B, and the protruding part is configured by both lips 457, 457.

Embodiment 5

In a tensioner unit according to a fifth embodiment of the present invention, in comparison to the previously described tensioner unit 100 according to the first embodiment, the rocking lever is made up of a base member and a pad fitted to a part of the base member including the abutment surface for abutment with the plunger, with the protruding part being formed on the pad.

Figure 10:
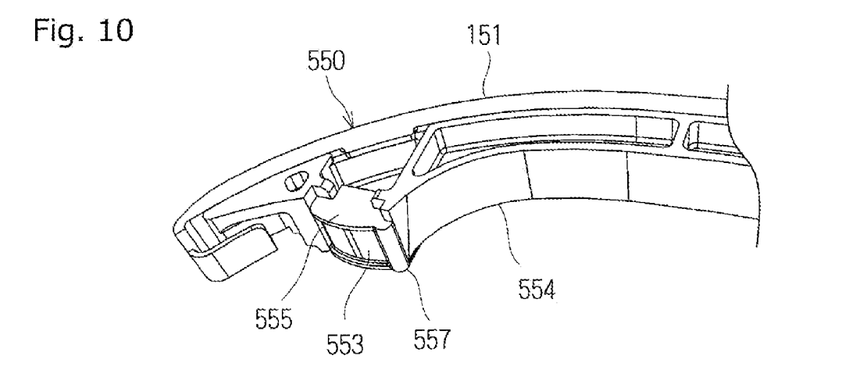
FIG. 10 is a perspective view of a rocking lever of a tensioner unit according to a fifth embodiment of the present invention.

The rocking lever 550 according to this embodiment is, as shown in FIG. 10, made up of a metal base member 554 in the form of a lever and a resin pad 555 having an abutment surface 553 that abuts on the plunger 130 fitted to the base member, with a protruding part 557 being formed on the pad 555. The protruding part 557 may be formed on the base member 554.

Embodiment 6

In a tensioner unit 600 according to a sixth embodiment of the present invention, in comparison to the previously described tensioner unit 100 according to the first embodiment, the protruding part is formed to the tensioner and not to the rocking lever.

Figure 11:
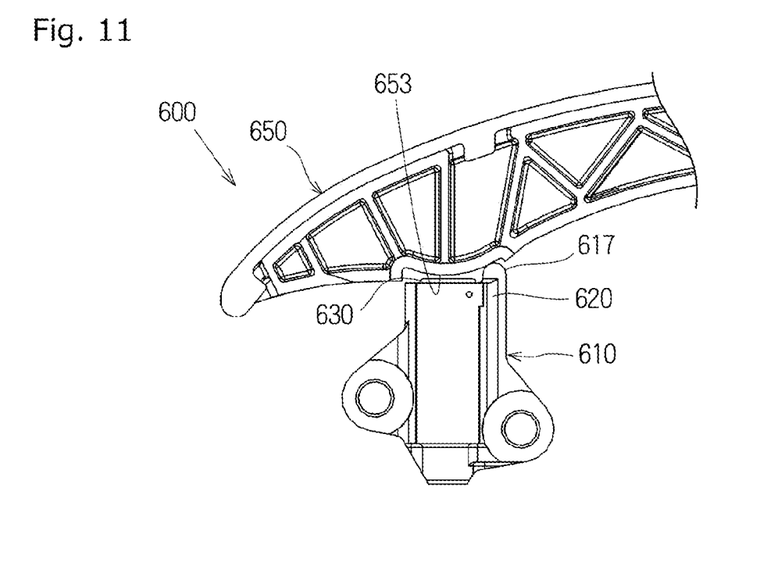
FIG. 11 is a front view of a tensioner unit according to a sixth embodiment of the present invention.

As shown in FIG. 11, the tensioner 610 of the tensioner unit 600 according to this embodiment has a protruding part 617 protruding from an end face of the tensioner body 620 at the distal end in the protruding direction of the plunger to make contact with a point on the rocking lever 650 adjacent the abutment surface 653 on the side closer to the boss part 152.

In this embodiment, the protruding part 617 has a semi-circular cross-sectional shape in the plane in which the chain runs, i.e., it is semi-columnar as a whole and extends along the entire width of the tensioner 610. Since the protruding part 617 has a curved surface near its apex (point at which it is brought into contact with the tensioner 610), the contact between the rocking lever 650 and the protruding part 617 of the tensioner body 620 is always stable even when the engine block or the rocking lever 650 expand or contract due to linear expansion caused by temperature changes inside the engine.

Since the protruding part 617 is formed to extend over the entire width of the tensioner 610 in this embodiment, it is brought into contact with the rocking lever 650 with a sufficient width so that the surface pressure is lowered and durability is improved.

The protruding part 617 may be provided anywhere near plunger 630 where the protruding part is able to contact a portion in the vicinity of the abutment surface 653 of the rocking lever 650.

The distance (protruding height) H between the abutment surface 653 of the rocking lever 650 and the tip end surface of the tensioner body 620 when the protruding part 617 is brought into contact with the rocking lever 650 is greater than the protruding amount h of the lead part of the plunger 630 from the tip end surface of the tensioner body 620 in a state where the plunger 630 sits on the bottom of the plunger bore 621 of the tensioner body 620, i.e., $h<H$.

Embodiment 7

In a tensioner unit 700 according to a seventh embodiment of the present invention, in comparison to the previously described tensioner unit 100 according to the first embodiment, the rocking lever and the tensioner are united.

Figure 12:
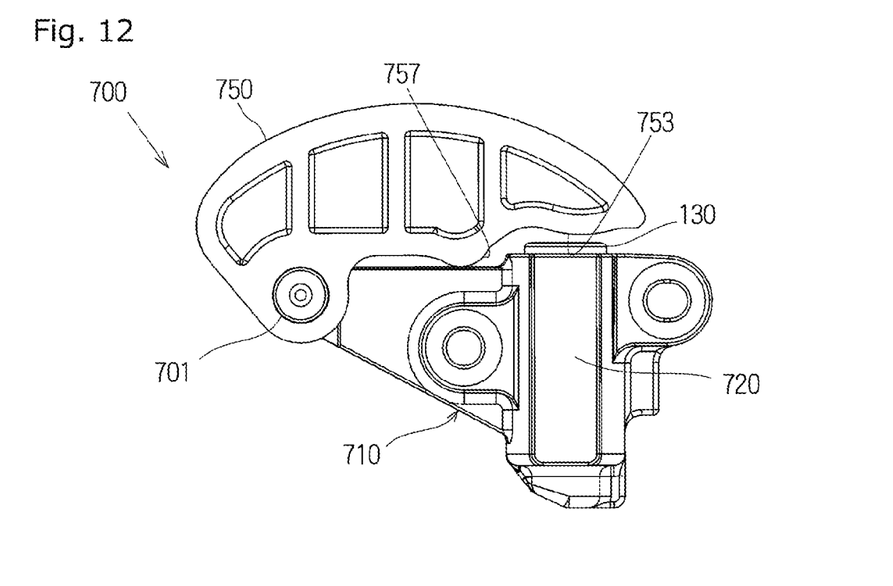
FIG. 12 is a front view of a tensioner unit according to a seventh embodiment of the present invention.

In this embodiment, as shown in FIG. 12, the tensioner unit 700 has a rocking lever 750 united therewith, rockably supported on a mounting shaft 701 provided at one end of the tensioner 710. A protruding part 757 is provided to the rocking lever 750 adjacent the abutment surface 753 at a position where it is brought into contact with the tip end surface of the tensioner body 720 of the tensioner 710.

The protruding part 757 may be provided to the tensioner body 720.

While specific examples of the tensioner and rocking lever according to the present invention have been described in the embodiments above, the tensioner and rocking lever according to the present invention are not limited to these examples, and the shapes, positions, sizes, and positional relationships with each other of various constituent parts may be changed in various manners.

For example, the rocking lever and the tensioner may both be provided with a protruding part.

While the tensioner and rocking lever of the present invention are applied to a timing system wherein a drive chain such as an endless roller chain and the like passed over respective sprockets of a crank shaft and cam shafts inside an engine room is slidably guided by a guide shoe, the present invention is not limited to this application and may be used for any transmission mechanisms that use chains, belts, ropes and the like, and can be applied in a variety of industrial fields.

What is claimed is:

1. A tensioner unit comprising:
   a tensioner including a tensioner body having a cylindrical plunger bore with an open end, a cylindrical plunger slidably inserted in the cylindrical plunger bore, and a biasing means that biases the cylindrical plunger outward of the cylindrical plunger bore;
   a rocking lever including a guide surface that makes sliding contact with an endless running transmission member, a rockably supported boss part, and an abutment surface provided on an opposite side from the guide surface for abutment with the cylindrical plunger; and
   a protruding part that is provided to the rocking lever near the abutment surface for abutment with the cylindrical plunger and that makes contact with a tip end surface of the tensioner body, wherein
   h and H satisfy the relationship of $h<H$, where h denotes a protruding amount of a lead part of the cylindrical plunger, where the lead part means a part protruding from the cylindrical plunger bore, from the tip end surface on an opened side of the tensioner body in a state where the cylindrical plunger sits on a bottom of the cylindrical plunger bore of the tensioner body, and H denotes an interval (a protruding height) between the abutment surface of the rocking lever and the tip end surface of the tensioner body when the protruding part is brought into contact with the tip end surface of the tensioner body.

2. The tensioner unit according to claim 1, wherein the rocking lever is provided with lips protruding more than the abutment surface on both sides in a width direction of the abutment surface,
   the protruding part being configured by at least one of the lips.

3. The tensioner unit according to claim 1, wherein the rocking lever is made up of a base member, and a pad fitted to a part of the base member including the abutment surface for abutment with the cylindrical plunger,
   the protruding part being formed to either one of the pad and the base member.

4. The tensioner unit according to claim 1, wherein the protruding part includes at least one groove in a tip end surface thereof.

5. The tensioner unit according to claim 1, wherein the protruding part includes one of a through hole and a blind hole that opens in a side face thereof.

6. The tensioner unit according to claim 1, wherein the rocking lever and the tensioner are united.

7. A rocking lever used in a tensioner unit including a tensioner body having a cylindrical plunger bore with an open end, a cylindrical plunger slidably inserted in the cylindrical plunger bore, and a biasing means that biases the cylindrical plunger outward of the cylindrical plunger bore, the rocking lever comprising a guide surface that makes sliding contact with an endless running transmission member, a rockably supported boss part, an abutment surface provided on an opposite side from the guide surface for abutment with the cylindrical plunger, and a protruding part that is provided near the abutment surface for abutment with the cylindrical plunger and that makes contact with a tip end surface of the tensioner body, wherein
   h and H satisfy the relationship of $h<H$, where h denotes a protruding amount of a lead part of the cylindrical plunger, where the lead part means a part protruding from the cylindrical plunger bore, from the tip end surface on an opened side of the tensioner body in a state where the cylindrical plunger sits on a bottom of the cylindrical plunger bore of the tensioner body, and H denotes an interval (a protruding height) between the abutment surface of the rocking lever and the tip end surface of the tensioner body when the protruding part is brought into contact with the tip end surface of the tensioner body.

* * * * *